Aug. 12, 1969 R. G. BRENT 3,460,440
HYDRAULIC BY-PASS VALVE ASSEMBLY
Filed Oct. 30, 1967 4 Sheets-Sheet 4

Fig.4.

INVENTOR.
ROBERT G BRENT
BY
Kenyon & Kenyon
ATTORNEYS

United States Patent Office 3,460,440
Patented Aug. 12, 1969

3,460,440
HYDRAULIC BY-PASS VALVE ASSEMBLY
Robert G. Brent, Arlington, Tex., assignor to Bell Aerospace Corporation, Wheatfield, N.Y., a corporation of Delaware
Filed Oct. 30 1967, Ser. No. 678,985
Int. Cl. F16b 13/04, 13/10
U.S. Cl. 91—447                                    7 Claims

ABSTRACT OF THE DISCLOSURE

The embodiment disclosed in the following specification illustrates a by-pass valve connected between a servo-valve and a hydraulic actuator. Even though the spool of the by-pass valve is coupled to a pilot's control stick in the same fashion as is the spool of the servo-valve, the porting arrangement on the by-pass valve is such that during normal operation the by-pass valve does not change the relationship between the servo-valve and the hydraulic actuator. However, if the spool of the servo-valve is jammed in any position, the porting conditions of the by-pass valve may be changed by virtue of pilot manipulations of the control stick so as to prevent hydraulic lock when the pilot mechanically engages and actuates the piston rod of the hydraulic actuator. Two check valves are connected across the ports of the by-pass valve to co-operate with the action of the by-pass valve in permitting fluid by-pass from one side of the hydraulic actuator to the other side of the hydraulic actuator through one or the other of the check valves and through the by-pass valve thereby avoiding the hydraulic lock condition. There is also disclosed a technique to provide irreversibility in connection with the by-pass arrangement so as to isolate the pilot's control stick from external forces which may be applied to the actuator and thus transmitted through the hydraulic system.

---

This invention relates in general to a hydraulic valve safety device and more particularly to an arrangement of by-pass and check valves used in conjunction with a servo-valve controlled actuator so that in case the servo valve jams, a fluid by-pass is provided thereby avoiding hydraulic lock and permitting direct mechanical movement of the actuator by the pilot.

The problem to which this invention is addressed arises in connection with the well-known servo valve controlled hydraulic actuator. These are employed, for example, aboard aircraft where the pilot by movement of his pilot's control stick moves the spool of the servo valve thereby applying hydraulic fluid under pressure to one side or the other of the piston head of a hydraulic actuator in order to cause some aircraft flight control element to be moved. It is well known to provide for a direct mechanical linkage from the pilot's control stick to the linkage that is normally moved by the hydraulic actuator so that the pilot will be able to fly his ship by direct manual control of the flight control surfaces in case the hydraulic system fails or the servo valve jams or freezes. If the cause of the malfunction that requires the pilot to directly mechanically control the flight control surfaces is the jamming or freezing of the hydraulic servo valve, then a serious problem due to hydraulic lock may arise. If the servo valve jams in certain positions, it may prevent fluid from flowing from one side of the piston head to the other side of the piston head in the actuator. In such a case, the actuator will be unable to move and because it is connected to the mechanical linkage that the pilot is now trying to control will prevent the pilot from being able to manipulate the flight control surfaces.

This hydraulic lock problem is a known problem and various techniques have been proposed to solve the problem. One technique involves requiring the pilot to turn off the hydraulic system. The resultant drop in pressure is employed to actuate a pressure responsive valve that then provides a by-pass for fluid from one side of the actuator piston head to the other side of the actuator piston head. The major disadvantage of this approach is that it requires turning off the hydraulic system entirely so that fluid under pressure is not available for other functions in the aircraft. A further disadvantage is that it requires the pilot to respond to the failure, to know or make a reasonable guess as to what the cause of the failure is, and then to throw an appropriate switch.

Accordingly, it is a major purpose of this invention to provide a means for automatically by-passing fluid from one side of an actuator to the other side in order to avoid hydraulic lock when the system's servo valve fails or jams in any position.

It is another related purpose of this invention to provide this objective without requiring that the entire hydraulic system be shut down.

It is important that the by-pass valving arrangement be of such a nature that if the by-pass valve itself jams or freezes there will be no hydraulic lock or blocking of a hydraulic system in such a fashion as to make it impossible for the pilot to control the aircraft's flight control surfaces.

Accordingly, it is a further purpose of this invention to provide a by-pass valving arrangement which co-operates with the servo valve arrangement in such a fashion that if either the by-pass valve or the servo valve locks or jams in any position it will continue to be possible for the pilot to manipulate the flight control surfaces through his flight control stick.

On of the important features in a hydraulic boost system is often termed "irreversibility." By irreversibility is meant that external forces applied to the actuator are kept isolated from the pilot's control stick. Specifically, this means that stresses and forces on the airfoils, which may come from a gust of wind or from extreme maneuvering conditions, do not travel back through the hydraulic system to the pilot's control stick and thus detract from his ability to properly control his stick and fly the aircraft.

Accordingly, it is a further purpose of this invention to provide the above listed purposes relating to a fluid by-pass valving arrangement in a manner that permits including this irreversibility feature.

SUMMARY OF INVENTION

In brief, the objects and purposes of this invention are achieved by interposing a by-pass and two check valves between the servo-valve and the hydraulic actuator. The two check valves are normally closed and are connected in opposition to one another in series across the actuator. The by-pass valve is connected between the servo valve and the actuator and thus the check valves are connected across the output of the by-pass valve as well as across the actuator. The by-pass valve has a spool which is connected to the pilot's control stick in much the same fashion as is the spool of the servo valve. The connection to the pilot's control stick is made through a stiff spring so that if the servo valve jams the pilot can overcome the effect of the spring and force the spool of the by-pass valve to move and thus change the porting conditions of the by-pass valve. The by-pass valve is ported so that under normal operating conditions the by-pass valve does not affect the hydraulic relationship between the servo valve and the actuator. The spool of the by-pass valve moves with movement of the spool in the servo valve since both of these spools are connected to the pilot's control stick.

The porting arrangement in the by-pass valve is such that normal movement of the spool does not change the porting conditions of the by-pass valve although the corresponding movement in the servo valve changes the porting conditions of the servo valve. However, if the servo valve becomes jammed in any state or position, the pilot by overcoming the force of the stiff spring which couples his control stick to the spools of the two valves is able to move the spool of the by-pass valve by an amount sufficient to change the porting relationship between the by-pass valve and the actuator. This then permits fluid flow from one side of the hydraulic actuator through one of the check valves and through the by-pass valve to the other side of the hydraulic actuator. In this fashion the hard over signal or the hydraulic lock, either of which would be detrimental to power operation or to direct mechanical engagement of the actuator by the pilot's control stick, is avoided.

Other objects and advantages of this invention will become apparent from the following detailed specification and drawings in which.

FIG. 1—STRUCTURE

Figure 1:
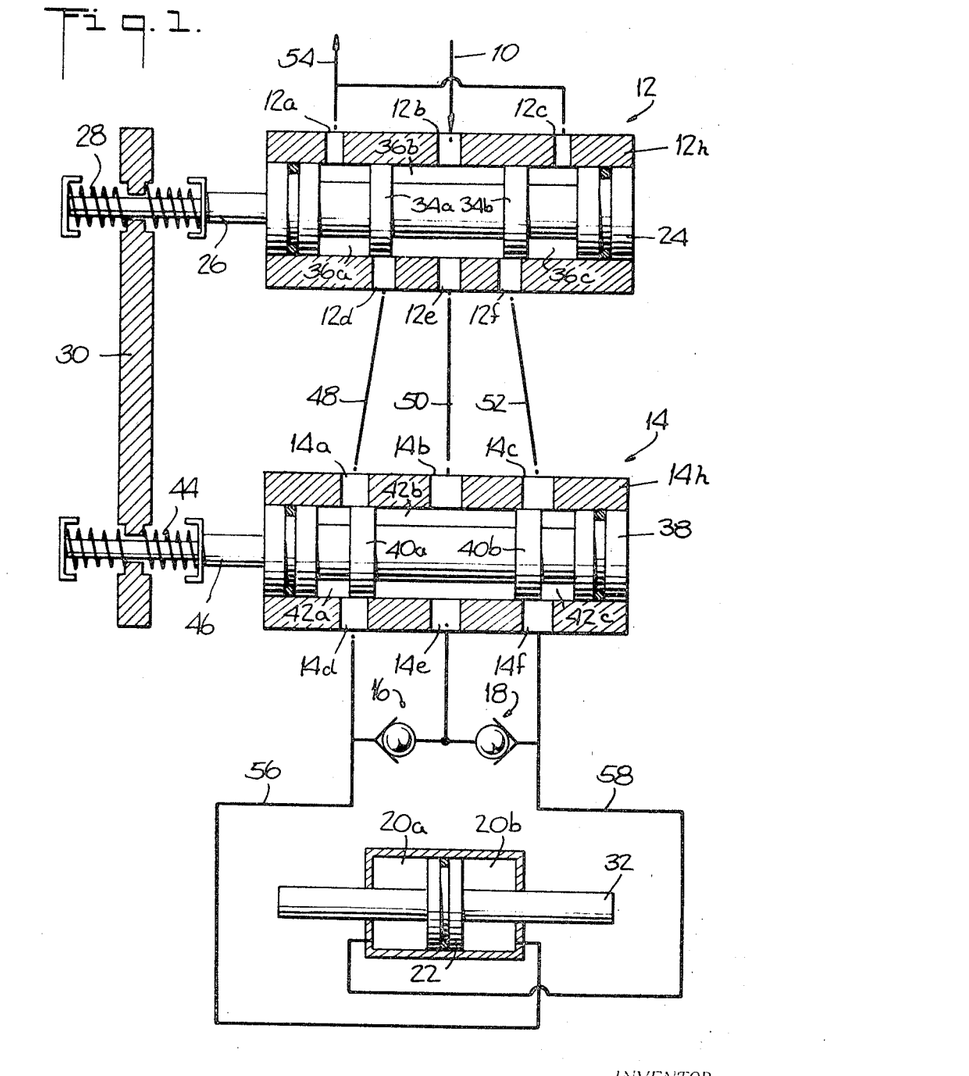
FIG. 1 is a hydraulic schematic of a first embodiment of this invention.

FIG. 1 is a simple hydraulic schematic of one embodiment of this invention whose functioning will best be understood if the structure relationships between the various elements of FIG. 1 are clearly in mind.

The state of the central valve 12 as shown in FIG. 1 is the normal quiescent state where no pilot inputs are being received and where the actuator rod is not being moved. Under this normal quiescent state there is no flow of fluid through the various valves and the actuator. Actually there is leakage flow but ideally there is no fluid flow.

As may be seen in FIG. 1, fluid under pressure (which may be 1,500 p.s.i.) is applied, by way of line 10, through the servo valve 12 and the by-pass valve 14 to a center point between the two facing check valves 16 and 18 and also to both sides of the piston head 22 in the hydraulic actuator 20. The lands 34a, 34b, 40a and 40b on the spools 24 and 38 of the servo valve 12 and by-pass valve 14 are undercut with respect to the ports to which they correspond in such a fashion that, when the valves 12 and 14 are in the neutral state shown, there is communication from the pressure line 10 through servo valve 12 and by-pass valve 14 to the actuator 20 chambers on both sides of the piston head 22. The amount of undercut and overcut (or underlap and overlap) of the lands relative to the ports with which they are associated is very small in the servo valve 12 (in the order of magnitude of 0.0015 inch) and relatively small even in the by-pass valve 14 (in the order of magnitude of 0.005 inch). However, to facilitate comprehension, the hydraulic schematic herein exaggerates the extent of underlap and overlap.

The control valve 12 is a standard type of control valve which is frequently called a servo valve in this type of application. The spool 24 of the servo valve 12 is connected by means of its stem 26 and through a resistant compression spring 28 to a link 30, which link 30 is connected to and moves with the pilot's control stick (not shown). The spring 28 is made sufficiently stiff so that it will not give under a force less than a certain predetermined force (for example 5 pounds) at the top of the pilot's control stick. Thus under normal operation the spring 28 does not give at all because the pilot need exert only a relatively slight force on the control stick in order to move the spool 24. However, as will be explained in greater detail under the description of the operation of FIG. 1, if the spool 24 of the control valve 12 becomes frozen then the pilot by exerting sufficient force to overcome the force of the spring 28 can cause the link 30 to move in spite of the frozen control valve 12 so that the pilot inputs may be made directly to the linkage to which the actuator rod 32 is connected thereby permitting direct mechanical control by the pilot of the aircraft flight control surfaces. The particular mechanism by which the pilot's control stick under these conditions is coupled to the actuator rod 32, or to the linkages of which the actuator rod 32 forms a part, is not shown herein since they are known in this art and are not part of the novel features which constitute this invention.

The spool 24 of the control valve 12 has two interior lands 34a, 34b, which together with the ends of the spool 24 serve to divide the interior of the valve 12 into three chambers 36a, 36b, 36c.

The by-pass valve 14 is a type of valve similar to the control valve 12. This by-pass valve 14 has a spool 38 having two interior lands 40a and 40b which divide the interior of the by-pass valve 14 into three chambers 42a, 42b and 42c. The by-pass valve 14 is coupled to the pilot's control stick (not shown) in a manner similar to that shown for the control valve 12; that is by way of stem 46, spring 44 and link 30. The spool 38 of the by-pass valve 14 is moved by the pilot's control stick by virtue of the relatively stiff spring 44 coupling between the link 30 and the stem 46 of the spool 38. The spring 38 is similar to the spring 28 in that it resists compression at pilot control stick forces less than, for example, 5 pounds. Thus the spool 38 and the spool 24 will both move in the same direction and to the same extent in response to pilot control stick commands.

The facing check valves 16 and 18 are held normally closed by a relatively light spring pressure in the order of magnitude of 3 to 5 pounds per square inch (p.s.i.). In the neutral state shown in FIG. 1, the chamber 36b is in communication with the ports 12b, 12d, 12e and 12f so that the fluid under pressure from the pressure line 10 is applied to the lines 48, 50 and 52 through the ports 14a, 14b and 14c; and thence through the chambers 42a, 42b and 42c, through the ports 14d, 14e and 14f to both sides of each check valve 16 and 18 as well as to the chambers 20a, 20b in the actuator 20.

OPERATION OF FIG. 1 UNDER NORMAL CONDITIONS

Under normal operating conditions, that is where neither the servo valve 12 nor the by-pass valve 14 is jammed or frozen, a motion in one direction of the pilot's control stick will cause the spools 24 and 38 to move to the right. This will result in the movement of the actuator rod 32 to the right for the following reasons. Movement of the spool 24 to the right will move the land 34a to the right thereby placing the port 12d in communication with the chamber 36a and thus in communication with the port 12a and the return line 54, which return line 54 can be assumed to be at reservoir pressure or zero gage pressure. This places the line 48, the port 14a, the chamber 42a, the port 14d, the line 56 and thus the chamber 20b at the zero gage reservoir pressure. The other chambers and ports are not changed in terms of their relationship to the pressure line 10 and thus the pressure in the chamber 20a stays at full pressure (for example, 1,500 p.s.i.) which causes the piston head 22 and thus the actuator rod 32 to move to the right. Fluid under pressure is supplied to the chamber 20a from the pressure line 10 through the port 12b, the chamber 36b, the port 12f, line 52, port 14c, chamber 42c, port 14f, and line 58.

From the symmetry of the valving and circuitry shown in FIG. 1 it is obvious that movement of the spool 24 to the left will have the comparable result of moving the actuator rod 32 to the left.

For the above operation to work, the amount of underlap of lands 40a and 40b with respect to the ports with which they are associated must be relatively large compared to the overlap between the lands 36a, 36b and their associated ports. In connection with this point it must be kept in mind that the spool 38 moves to the right just as does the spool 24 because they are both tied through springs 28 and 44 to the link 30. However, the housings 12h and 14h of the valves 12 and 14 are mounted, in a known fashion, so as to travel with the actuator rod 32. Thus any movement of the spools 24 and 30 is followed by movement of their respective housings 12h and 14h in order to bring the valves 12 and 14 back into the neutral position shown in FIG. 1 after the desired actuator rod 32 position change has been effected. With this operation in mind, it can be seen that as long as the lands 40a and 40b are undercut relative to the ports (14a, 14d and 14c, 14f) with which they are associated substantially more do the lands 34a and 34b overlap the ports (12d and 12f) with which they are associated, then the above described mode of operation will properly occur.

In this description of normal operating conditions, no reference has been made to the two check valves 16 and 18 because under normal operating conditions these two check valves remain closed and do not perform any function. Indeed, the arrangement of the by-pass valve 14 is such that it too does not perform any function during normal operating conditions and could readily be eliminated except for the function it performs when and if the servo valve 12 freezes.

OPERATION DURING SERVO VALVE FAILURE (a) Servo valve jammed in neutral.—If, for example, a chip of metal in the hydraulic system causes the spool 24 of the servo valve 12 to jam then the FIG. 1 arrangement operates as follows.

First, assume that the spool 24 jams in the neutral position shown in FIG. 1. The pilot will then find that he has to exert a relatively large force at the top of his control stick in order to obtain movement. This force will be dictated by the force necessary to compress the spring 28. The pilot then directly mechanically engages the linkage to which the actuator 32 is connected. The means by which this is achieved is well known in the art and need not be shown here. In this fashion the pilot moves the actuator rod 32 in the desired direction and to the desired extent.

Assume that the actuator rod 32 is being driven to the right. The pilot will thereby be exerting force on the fluid in chamber 20b which will be transmitted through the line 56 to the seat of the check valve 16. This force resulting from the pilot's driving of the linkage connected to the actuator rod 32 will be in addition to the force due to the fluid under pressure from the line 10. Since the assumption is that the servo valve 12 has jammed in the position shown in FIG. 1, fluid under its regular input pressure will be applied to the seat of the valve 16 as well as to the movable member side of the check valve 16. But, because of the additional force due to the pilot induced pressure in the chamber 20b the check valve 16 will open so that fluid can flow through the check valve 16, through the port 14e and into the chamber 42b of the by-pass valve 14. Because of the motion of the pilot's control stick, the spool 38 in the by-pass valve 14 will also move to the right, so that the port 14f is placed in communication with the chamber 42b, thereby providing a path for fluid out of the chamber 42b, through the port 14f, to the chamber 20a. Thus a completed fluid path from chamber 20b to chamber 20a is established and the actuator rod 32 is free to move to the right because the fluid displaced from the chamber 20b is free to flow into the chamber 20a.

Under these conditions, the check valve 18 does not open because whatever differential pressure may exist across the check valve 18 will only tend to keep it closed. The fact that the movable portion of the check valve 18 is upstream from the seat of the check valve 18, as far as the fluid circuit just described is concerned, means that whatever drop occurs as fluid flows through the circuit just described will tend to maintain the normally closed check valve 18 closed.

From the symmetry of the design shown in FIG. 1, it is obvious that if the actuator rod 32 were moved to the left, a comparable circuit would be established in which the check valve 18 would be opened and the check valve 16 remain closed to permit fluid to flow out of the chamber 20a and into the chamber 20b by virtue of a completed fluid circuit through the opened check valve 18.

(b) Servo valve jammed when displaced.—It is conceivable that the spool 24 will jam in a position other than the neutral position shown in FIG. 1 and discussed above. Assume, for example, that the spool 24 has been moved to the right and for some reason is jammed to the right. Such a condition tends toward runaway flow. But, the operation of the by-pass valve 14 is such that a condition comparable to a massive leak is created which in effect stalls the actuator 20.

What happens is that when the pilot has moved his control stick to the desired position, which has moved the spool 24 of the servo valve 12 to the right, the jamming of the spool 24 in that position results in the actuator rod 32 moving to the right and the housing 14h of the by-pass valve 14 also moves to the right as is normal. The housing 12h of the servo valve 12 also moves to the right since it too is mechanically connected to the actuator rod 32. But, because the spool 24 is jammed to the housing 12h, a force is transmitted back through the spring 28 to the pilot's control stick which tells the pilot that something has gone wrong. The pilot by holding his control stick in the desired position will override the spring 28 so that the stem 46 and spool 38 of the by-pass valve 14 will be held against additional movement to the right. But because the actuator rod 32 is moving to the right, the housing 14h of the by-pass valve 14 will move to the right so that the porting condition in the by-pass valve 14 will change to the condition which is equivalent to moving the spool 38 of the by-pass valve 14 to the left. When the spool 38 has moved to the left (relative to the housing 14h of the by-pass valve 14) sufficiently so that the ports 14d and 14e are placed in communication through the chamber 42b, then inlet pressure will be applied through the line 50, port 14b, chamber 42b, port 14d and line 56 to the chamber 20b of the actuator 20. This inlet pressure will balance out the inlet pressure that is applied to the chamber 20a of the actuator 20 thereby preventing further actuator rod 32 movement to the right.

If the pilot holds this position of the control stick, fluid will flow from the pressure line 10 through the center ports and chamber of the servo valve 12, down the line 50, through the port 14b, into the chamber 42b and then out the port 14a, up the line 48, through the port 12d, chamber 36a, port 12a into the return line 54 and thence to the reservoir. Remember that the assumption above is that the spool 24 of the servo valve 12 is jammed to the right and thus to the chamber 36a will be in communication with the port 12d so that the hydraulic circuit just outlined will be complete. Thus the by-pass valve 14 creates a condition which results in relatively large fluid flow through the jammed servo valve 12 and by-pass valve 14 but which at least keeps the pressure on both sides of the actuator and piston head 22 equal.

If the pilot now wishes to force the actuator rod 32 further to the right, it will be seen that FIG. 1 provides a fluid path for fluid from the chamber 20b to the reservoir. This fluid path is through the line 56, the port 14d, chamber 42a, port 14a, line 48, port 12d, chamber 36a and port 12a to the return line 54.

From the symmetry of the arrangement shown it is obvious that a jamming of the spool 24 to the left will result in a comparable hydraulic circuit being established to provide the same result as when the spool 24 jams to the right.

Operation when the by-pass valve jams

It would of course be futile to add the valving of this invention if this would create a situation where the by-pass valve 14 if it jammed would create a hydraulic lock. Thus, it is important that the design be such that if the additional valves added by virtue of this invention jammed, the system will be operable.

Assume that the servo valve 12 continues to operate properly and that the spool 38 in the by-pass valve 14 has jammed in the neutral position shown in FIG. 1. It will readily be seen that under such considerations there will be no noticeable change in operation of the hydraulic system. It is true, that the pilot will have to put in a physical force input sufficient to overcome the spring 44 in order to get movement out of the link 30 and thus the desired movement of the spool 24. But apart from this consideration, the spool 24 will move in the desired direction to establish the normal operating connections discussed above under normal operating conditions. The by-pass valve 14 is designed in such a fashion that when its spool 38 is jammed, the by-pass valve 14 affords the same type of communication from the line 48 to the line 56 and from the line 52 to the line 58 as under normal operating conditions.

From the above description of the operation of the FIG. 1 valving arrangement under normal conditions, it will be seen that the spool 38 of the by-pass valve 14 is never normally in a hydraulic position other than as shown in FIG. 1. That is, when the servo valve 12 spool 24 is moved to the right and thus the by-pass valve 14 spool 38 is moved to the right, the amount of undercut of the land 40b relative to the ports 14c and 14f is sufficiently great so that there is always communication between these ports 14c, 14f and the chamber 42c. It is only when the servo valve 12 jams that the porting arrangement in the by-pass valve 14 is changed. Thus if the by-pass valve 14 does jam it will be in a state that provides the porting condition as shown in FIG. 1, which, for the reasons just described, means that the hydraulic system will continue to operate properly as long as the servo valve 12 is not jammed.

THE FIG. 2 EMBODIMENT

Figure 2:
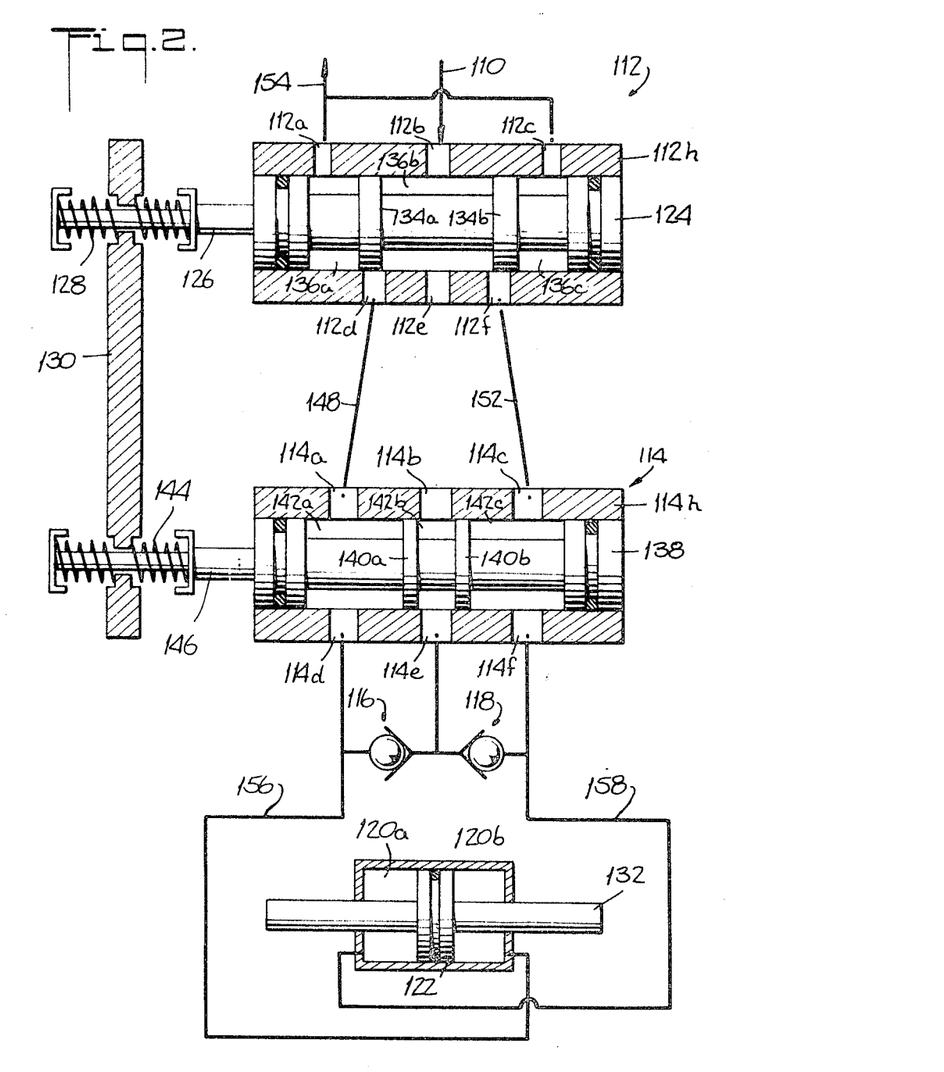
FIG. 2 is a hydraulic schematic of a second embodiment of this invention.

FIG. 2 represents a second embodiment of this invention in which the spool and porting arrangements of the servo valve and by-pass valve are somewhat different and in which the manner in which the check valves face one another is reversed. FIG. 2 is provided in order to show the basic inventive concept may be adapted to a variety of spool and porting arrangements.

A clear understanding of the above described operation of the FIG. 1 embodiment should enable one to make a fairly ready analysis of the operation of the FIG. 2 embodiment and thus the following description of the structure and of the FIG. 2 embodiment is kept brief and presumes a thorough understanding of the structure and operation of the FIG. 1 embodiment. To facilitate the comparison between the two embodiments, comparable reference numerals are employed as much as possible. The reference numerals used in connection with the FIG. 2 embodiment are "100" greater than the reference numerals used in connection with the FIG. 1 embodiment so that the FIG. 2 spool 124 corresponds to the FIG. 1 spool 24.

FIG. 2—STRUCTURE

The special structural features of the FIG. 2 embodiment which should be kept in mind are as follows. The check valves 116 and 118 are arranged back to back, meaning that the seat portions of the check valves are connected to one another and to the port 114e.

The spool 138 of the by-pass valve 114 is substantially different than the comparable spool 38 in the FIG. 1 embodiment. The lands 140a and 140b, in the normal state shown, do not overlap any of the by-pass valve ports and closely bracket the center ports 114b, 114e. Furthermore, these lands 140a, 140b are quite narrow in width so that for the reasons described further on, movement of the spool 138 in response to the jamming of the servo valve 112 will permit communication between the center ports 114b, 114e and one or the other of the chambers 142a, 142b. The width of the lands 140a, 140b however must be sufficiently great so that normal operating movement of the spool 138 will not change the porting arrangement shown. A typical servo valve has a spool travel no more than plus or minus 0.040 inch and thus the lands 140a, 140b will have to be in some amount larger than that. In one embodiment these lands are made equal to 0.050 inch.

The servo valve in the FIG. 2 embodiment is identical to the servo valve in the FIG. 1 embodiment and thus nothing need be stated concerning its structure.

FIG. 2—OPERATION

With the operation of the FIG. 1 embodiment in mind, it should be obvious from an inspection of FIG. 2 that under normal operating conditions the porting arrangement of the by-pass valve 114 does not change and is entirely comparable to the porting arrangement of the by-pass valve 14 in the FIG. 1 embodiment. In effect, the lines 156 and 148 are always in communication with one another through the by-pass valve 114 and the lines 152 and 158 are always in communication with one another through the by-pass valve 114. The check valves 116 and 118 remain closed during normal operation because of a spring bias of between three and five p.s.i. As mentioned above, the basic reason why the porting arrangement of the valve 114 does not change when the spools 124 and 138 are moved, under normal operating conditions, is that the width of the lands 140a, 140b is greater than the maximum travel of the spool 138.

However, if the servo valve spool 124 jams, then the pilot will find it necessary to force his control stick over (against the resistance of the springs 128 and 144) by an amount sufficient to move the spool 138 a distance greater than the width of the lands 140a, 140b.

Suppose, for example that the servo valve spool 124 jams in the position shown. If the pilot wishes to move the actuator rod 132 to the right, he will move his control stick to move the by-pass spool 138 to the right a sufficient distance so that the land 140a will be straddled by the port 114e. Now, under this porting condition, pilot induced pressure in the actuator chamber 120b (due to pulling or forcing the actuator rod 132 to the right) will provide additional pressure (over inlet pressure) in the line 156 and through the port 114b, chamber 142a, the port 114e to the seat of the check valves 116, 118. The check valve 116 will not open because a comparable pressure has been exerted on the movable portion of the valve 116 since it is, relative to its own seat, upstream as far as this hydraulic connection is concerned. However, the valve 118 will thereby be forced open and fluid will be free to flow through the check valve 118 and line 158 into the chamber 120a. Thus a hydraulic circuit is completed which permits the piston 122 and associated rod 132 to move to the right.

From the symmetry of the arrangement in FIG. 2, it is obvious that a comparable hydraulic relief circuit will be provided when the actuator is moved to the left, in which case it is the check valve 116 that will be open and the check valve 118 that will remain closed.

Irreversibility

Figure 3:
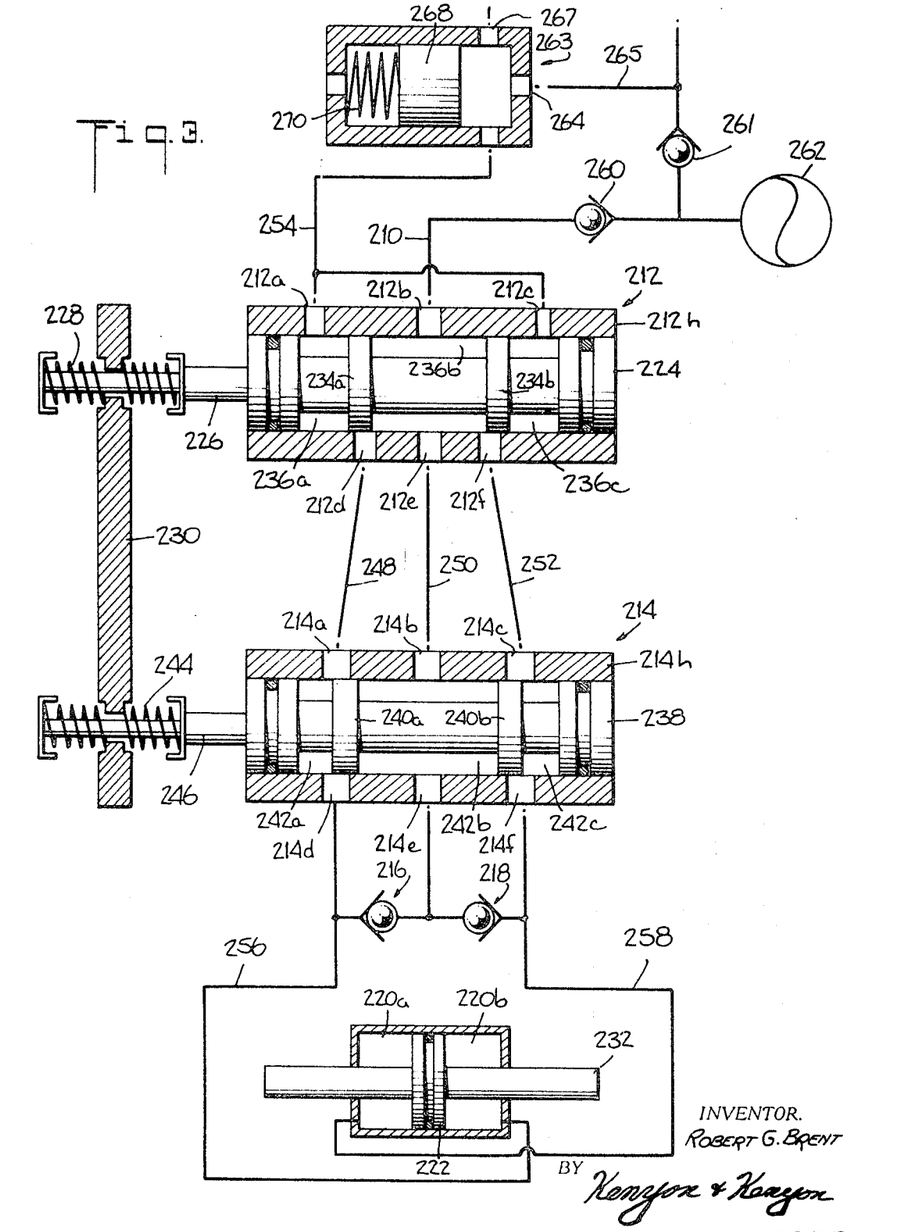
FIG. 3 is a hydraulic schematic of the features that may be added to the FIG. 1 embodiment to provide irreversibility.

FIG. 3 is a modification of the embodiment of the invention shown in FIG. 1 to include an irreversibility feature. Irreversibility means that external forces applied to the actuator are kept isolated from the pilot's control stick. All elements in FIG. 3 which are identical to those shown in FIG. 1 have the same last two digits as those of FIG. 1.

In FIG. 3, a conventional check valve 261 has been placed in line 210 to prevent back flow through line 210 out of the valve 212. A second check valve 260 has been placed in the line 210 and has a directionality identical to that of check valve 261. A conventional accumulator 262 is joined to line 210 at a point between check valves 261 and 260. Accumulator 262 during normal operation will remain in a charged condition and will not take an active part in moving piston 222. When pump pressure to the system is reduced or shut off it is desirable to maintain pressure in the system to prevent the piston 222 from moving in response to external forces and to prevent the formation of air bubbles in the system. In an ideal system all that would have to be done would be to shut the lines 210, 254 leading to the system, thereby locking fluid in the system. However, in all real systems there is a certain amount of leakage and, while it is often at a small rate, over a period of time it can be serious. As fluid leaks out, the pressure will drop and air will come out of solution to form air bubbles which create a "springiness" in the system. To overcome this problem, accumulator 262 is joined to line 210 and when there is a drop in pressure in line 210 due to system leakage after the pressure supply has been shut off the accumulator will discharge through check valve 260. This will maintain fluid pressure in the system for a substantial period of time.

Check valve 261 will insure that the fluid discharged to line 210 by accumulator 262 will remain in the system and not escape the system by line 210. To aid in keeping fluid trapped in the system a pressure responsive valve 263, of conventional design, is placed in return line 254. Under normal operation, pressure will be applied to the system and fluid in line 210 will be directed by line 265 to signal port 264 of pressure responsive valve 263. The fluid from signal port 264 will bear against the right surface of piston 268 moving the piston to the left overcoming spring 270 and allowing return line 254 to discharge and not be blocked. When the pressure to the system is decreased or is cut off it is important, as previously described, to maintain fluid in the system. Thus, it is important to insure that line 254 be blocked from discharging to its low pressure reservoir. Pressure responsive valve 263 will accomplish this since when the pressure to the system is cut off there will be no fluid from line 210 to be directed to signal port 264 to bear against piston 268 and spring 270 will shift the valve to the right blocking communication between inlet port 266 and discharge port 267 stopping any fluid in line 254 from discharging. During this condition accumulator 262 will maintain system pressure and supply make-up fluid to the system.

A conventional lost motion linkage (not shown) is provided in aircraft navigational systems between the pilot's control stick and the piston rod 232 so as to permit direct mechanical actuation of the rod 232 once the control stick has been moved by an amount greater than the magnitude of the lost motion. The magnitude of the lost motion linkage is greater than the distance the servo valve spool 224 has to move in its housing 212h to change the porting conditions in the servo valve 212. The lost motion linkage thus allows the pilot, under normal conditions, to change the porting conditions of the servo valve 212 in order to hydraulically actuate the piston rod 232 all within the magnitude of the lost motion. Accordingly, under normal conditions, the pilot will not directly move the piston 222 and the piston 222 will be solely hydraulically actuated.

As discussed above, the magnitude of the servo valve spool 224 motion necessary to change servo valve porting conditions is significantly less than the magnitude of the by-pass valve spool 238 motion necessary to change by-pass valve 214 porting conditions. However, the magnitude of spool 238 motion necessary to change porting conditions of the by-pass valve 214 is still within the lost motion zone since it is necessary that the by-pass valve 214 porting conditions be changed prior to pilot mechanical actuation of the piston rod 232. This necessity arises from the necessity of providing for the hydraulic by-pass to avoid hydraulic lock in order to obtain piston 232 movement.

With the above relationship between the lost motion linkage arrangement and the spool 224 and 238 travel conditions in mind, it is possible to understand how the addition of the check valve 260 provides a hydraulic system that will be irreversible for certain conditions.

Irreversibility operation (a) *In general.*—In connection with this discussion of irreversibility it is helpful to keep in mind the following general consideration. With reference to FIG. 3, for example, a force transmitted to the piston 222 from the rod 232 tends to force fluid out of one of the two chambers 220a or 220b. If a fluid path is provided which permits the fluid to flow from one of these two actuator chambers 220a, 220b to the other, then the piston 222 will be able to move a distance sufficient to take up the lost motion distance and thereby mechanically connect up to the pilot's control stick linkage. As a consequence, the pilot will feel the force or jolt in his control stick. This is the reversibility condition, meaning specifically that not only are motions of the pilot's control stick transmitted to the piston 222 but also that externally imposed motions of the piston 222 are transmitted to the pilot's control stick. It is desirable to provide irreversibility in the hydraulic design so that this reverse coupling is avoided.

As the following description of the irreversible feature will show, irreversibility is attained by the addition of the check valve 260 in the input line and by the fact that the porting of the servo valve 212 and by-pass valve 214 as well as the direction of operation of the check valves 216 and 218 are such that under most conditions of operation there is no by-pass provided from one chamber to the other in the hydraulic actuator when an external force tends to move the piston 222. Thus it will be noted that the design of this invention is such that providing by-pass between the actuator chambers under conditions of servo valve freeze does not in general create by-pass under conditions of external force application to the piston 222.

In broad terms, and with reference to FIG. 3, the general reason why irreversibility is achieved is that whenever an external force tends to move the piston 222 so as to force fluid out of one of the two chambers 220a, 220b, the various paths to the other chambers of the actuator are blocked by virtue of: (a) one of the two check valves 216, 218 preventing passage through these valves, (b) one of the lands 240a or 240b of the by-pass valve 214 blocking communication through one of the ports 214d or 214f to prevent fluid flow through the by-pass valve 214, and (c) one of the lands 234a or 234b being in a position relative to the housing 212h so as to block communication with one of the ports 212d or 212f so as to prevent fluid passage through the servo valve 212. In addition, and of essential importance, the additional check valve 260 prevents fluid flow back into the input line 210 so that a hydraulic lock is created in the system to prevent piston 222 from moving in response to external forces.

The following detailed description of the operation of this irreversible feature will make clear the above mentioned general relationships.

(b) *FIG. 3–Servo valve neutral and unjammed.*—In normal operation, the embodiment of FIG. 3 will operate identically to the embodiment shown and described in FIG. 1.

If the power to the system is on, there will be an irreversible condition with the servo valve in a neutral and unjammed condition.

If an external force is applied to piston rod 232 pushing piston 222 to the left, the fluid in chamber 220a will tend to dishcarge to allow the piston to move to the left under the influence of the external force. In the neutral condition with a leftward external force, some fluid from chamber 220a will discharge through line 258, port 214f, chamber 242c, port 214c, line 252, port 212f, chamber 236b to port 212d, line 248, port 214a, chamber 242a, port 214d and line 256 to chamber 220b. The fluid in chamber 236b cannot discharge from the system because of check valve 260.

For the reasons noted immediately below, the amount of fluid that will leave chamber 220a by the above route is very small since the consequent movement to the left of the piston 222 and rod 232 will move the servo valve housing 212h to the left to change the porting conditions in the servo valve 212 and thereby break the above hydraulic circuit. In particular, the consequent movement to the left of the housing 212h will cause the land 234a to block communication between the port 212d and the chamber 236b. As a consequence, the completed fluid circuit from actuator chamber 220a to actuator chamber 220b will be broken and fluid lock will prevent further movement of the piston 222. The amount of piston 222 movement necessary to effect this change in servo valve 212 porting conditions is less than the lost motion provided by the lost motion linkage and thus the pilot's control sick will not be affected by the above described motion of piston 222.

It can readily be seen that the check valve 260 and the land 240a in the by-pass valve 224 prevent the completion of alternate hydraulic circuits.

In addition, the check valve 260 prevents fluid from flowing out of the chamber 220a up through the first portion of the hydraulic circuit outlined above and into the input line 210. Without check valve 260, fluid discharged into the input line 210 would permit sufficient piston 222 travel to result in the external force being transmitted to the pilot's control stick. The check valve 260, therefore, makes sure that the hydraulic circuit is closed in such a fashion that the desired hydraulic lock to provide irreversibility is obtained.

Parallel reasoning will show that a similar result will occur when a rightward force is externally applied to piston 222.

(c) *FIG. 3—Servo valve in operation and unjammed.*— Irreversibility will also be obtained (under normal operation, with power on and the servo valve 212 unjammed) when the servo valve spool 224 is displaced in either direction in response to the pilot's control stick so as to provide hydraulic power for moving the piston 222 and rod 232.

Assume that the pilot has moved the servo valve spool 224 to the right relative to the servo valve housing 212h so that the land 234a blocks the port 212d. This is a condition under which hydraulic power will be supplied to the actuator chamber 220a to drive the piston 222 to the right. In this state, a rightward external force on the piston 222 will act cumulatively with the power fluid in line 258 to move piston 222 to the right. This rightward movement of piston 222 will move the servo valve housing 212h to the right relative to the spool 224 to bring the servo valve 212 to the porting conditions shown in FIG. 3. But, as has been described above, there is irreversibility in the state shown in FIG. 3. Specifically, if the external rightward force persists the servo valve housing 212h will continue to be forced to the right relative to its spool 224 until the land 234b blocks the port 212f and thus breaks the hydraulic circuit connecting the two actuator chambers 220a, 220b.

If, instead of a rightward external force, a leftward external force acts on the piston 222 (again, assuming that the pilot has moved the servo valve spool 224 to the right relative to its housing 212h) irreversibility will be obtained. The leftward external force will be resisted by the hydraulic pressure which is serving to move the piston 222 and rod 232 to the right. Indeed, under this condition the whole point of the hydraulic operation is to move the piston 222 to the right against external resistance. However, if the leftward external force persists after the desired control element position has been obtained, then the servo valve 212 is in the neutral position shown in FIG. 3 and, for the reasons discussed above, irreversibility is obtained. Specifically, the leftward force will cause the servo valve housing 212h to move to the left relative to its spool 224 by an amount sufficient to cause the land 234a to block the port 212d and thus break the fluid circuit between the two actuator chambers 220a and 220b.

Parallel analysis will show that when the pilot has moved the servo valve spool 224 to the left relative to the housing 212h, irreversibility is also obtained.

It might also be noted that when the power to the fluid system is shut off, irreversibility is generally obtained in much the same fashion as it is obtained in the above described conditions where power is presumed to be on but that during all maneuvering a reversible condition will prevail. When power to the system is off, the pressure responsive valve 263 in the return line 254 will close and the hydraulic system shown will thereby be closed. Under these conditions, pressure is maintained by virtue of the action of the accumulator 262 in conjunction with the action of the two check valves 260 and 261. For reasons very similar to the ones discussed above, irreversibility will then be obtained for all positions of the servo valve 212 as long as the lost motion has not been taken up. However, since there is no hydraulic power, the pilot will have to take up the lost motion in order to mechanically engage the piston 222. While the pilot is thus directly flying the aircraft, any external force applied to the piston 222 will be felt by the pilot. Thus a reversible condition will prevail during appreciable periods of time when power is off.

It might also be noted that the irreversibility which is obtained under all operating conditions where the servo valve 212 is unjammed is not generally obtained when the servo valve 212 is jammed.

FIG. 4.—EMBODIMENT

Figure 4:
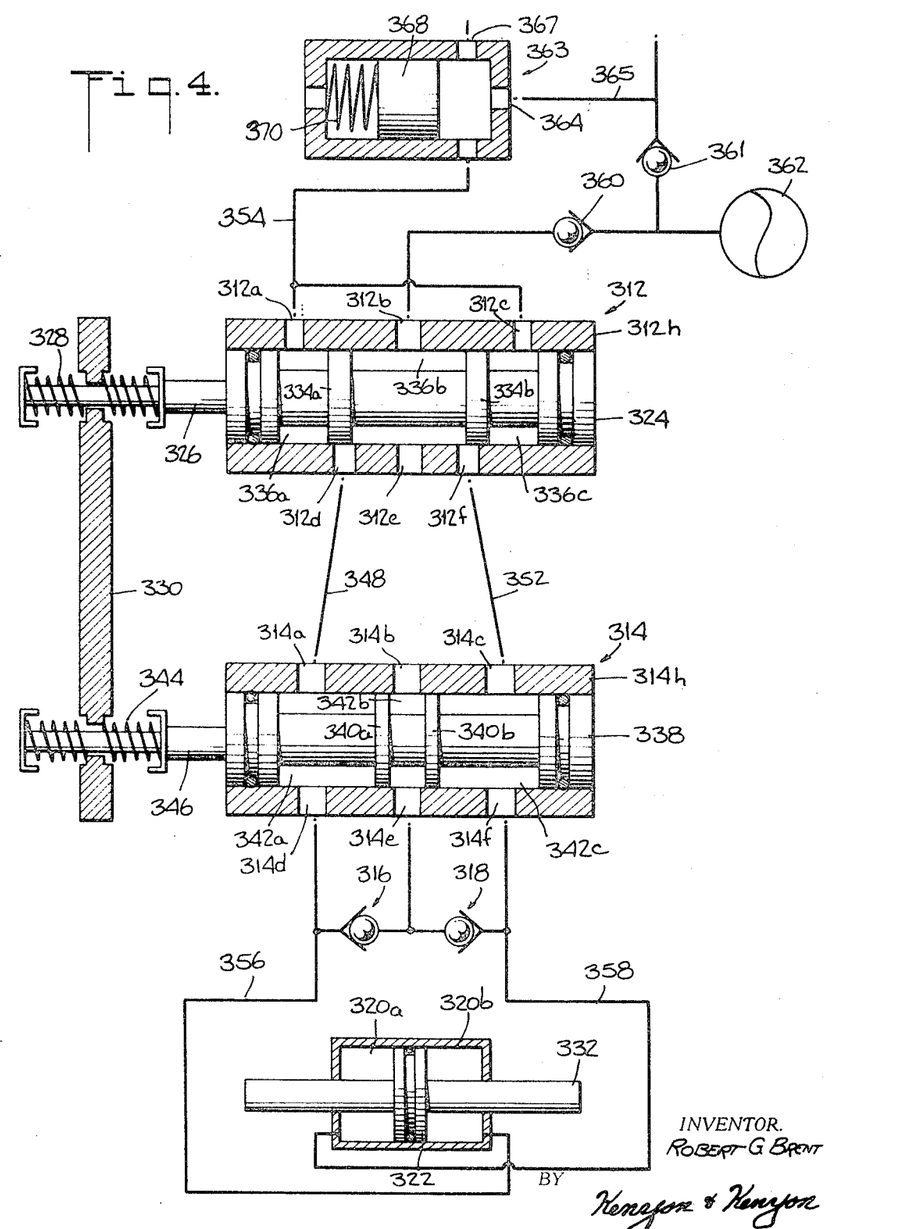
FIG. 4 is a hydraulic schematic of the features that provide irreversibility in the FIG. 2 embodiment.

The FIG. 4 embodiment is similar to the FIG. 2 embodiment but by virtue of the operation of the check valve 360 has an irreversibility feature. The additional valving arrangement in FIG. 4 is the same as the valving arrangement that has been added in connection with FIG. 3 and performs the same function in relationship to the FIG. 2 embodiment as does the added valving shown in FIG. 3 perform in relationship to the FIG. 1 embodiment. Thus similar reference numerals are employed in FIG. 4 as are employed in FIGS. 2 and 3 to the extent that the last two digits of the numerals are the same and it is only the initial numeral "3" which differs. Thus it will not be necessary to repeat the operation of those aspects of the system of FIG. 4 which have already been discussed in connection with the above discussion of FIGS. 2 and 3.

The lost motion linkage (which is not shown and which is discussed in connection with the FIG. 3 embodiment) is employed for exactly the same reasons as in the FIG. 3 embodiment. The following description of why the FIG. 4 embodiment provides irreversibility requires keeping in mind the function and existence of this lost motion linkage. It should be kept in mind that the lost motion distance is greater than the distance the by-pass valve spool 338 must move relative to its housing 314h to change the porting conditions of the by-pass valve 314 as well as greater than the distance the servo valve spool 324 must move relative to its housing 312h to change the porting conditions of the servo valve 312.

With the power on and servo valve 312 in a neutral position, as shown in FIG. 4, there will be a condition of irreversibility. If an external force is applied to the piston 322 in, for example, a leftward direction then the fluid in actuator chamber 320a will tend to discharge. Some fluid will discharge from the chamber 320a through the line 358, port 314f, chamber 342c, port 314c, line 352, port 312f, chamber 336b, port 312d, line 348, port 314a, chamber 342a, port 314d and finally through line 356 into the other actuator chamber 320b. As a consequence the piston 322 will move slightly to the left and the connected servo valve housing 312h will be forced to the left until the porting conditions of the servo valve 312 are changed so that the land 334a blocks communication between the chamber 336b and the port 312d. This breaks the above described path of fluid flow and provides the required fluid lock to obtain irreversibility. From the symmetry of the design, it should be clear irreversibility will be obtained for parallel reasons if the external force is applied in a rightward direction.

If the power is on and the pilot has moved the servovalve spool 324 in either direction in order to change the porting conditions of the servo valve 312 so as to apply power to move the piston 322 there will also be a condition of irreversibility. The analysis under this situation is very similar to the analysis made in connection with the FIG. 3 embodiment and reference is made thereto for an understanding of how the FIG. 4 embodiment provides irreversibility. All that need be pointed out is that the servo valve 312 will be brought to its neutral position so that if the external force persists the relationship between the servo valve housing 312h and spool 324 will change in the fashion described above to block either the port 312d or the port 312f.

When power to the hydraulic system is off, the return line valve 363 will close so that a closed system will be provided for which pressure will be maintained by the accumulator 362 in conjunction with the check valves 360 and 361. Under this condition, irreversibility will be obtained for reasons substantially identical to those that apply to the situation when power is on except for the time during which the pilot is maneuvering and thus has taken up the lost distance motion to mechanically move the piston 322 and associated piston rod 332. It should be evident that when the lost motion is taken up, any external force applied to the piston 322 will be felt by the pilot since his control stick is mechanically linked to the piston 322.

Two main embodiments of this invention have been described in the above specification (as illustrated in FIGS. 1 and 2). In addition two subsidiary embodiments have been described which incorporate irreversibility features (as illustrated in FIGS. 3 and 4). It should be understood that various modifications of the embodiments described could be made by those skilled in this art having the above teachings before them without departing from the scope and teachings of this invention. Accordingly, it is intended in the following claims to encompass all such variations.

What is claimed is:
1. In a hydraulic actuator system having a servo valve hydraulically coupled to the actuator to regulate the flow of fluid under pressure to the actuator, the improvement of a by-pass circuit for permitting fluid flow between the chambers of the actuator when the servo valve is jammed and when there is direct mechanical coupling to the actuator, so that hydraulic lock in the actuator is avoided, comprising:
    (a) first and second opposing normally closed check valves connected in series across said actuator, and
    (b) a by-pass valve connected between said servo valve and said actuator, said by-pass valve having a neutral state, a first by-pass state and a second by-pass state, said by-pass valve when in said neutral state providing normal coupling, through said by-pass valve, between said servo valve and said actuator,
    said by-pass valve when in said first by-pass state providing a fluid by-pass around said first check valve and when in said second by-pass state providing a fluid by-pass around said second check valve.

2. The improvement of claim 1 wherein said check valves are hydraulically coupled to one another at a point which is coupled to the fluid under pressure.

3. In a hydraulic actuator system having a servo valve hydraulically coupled to the actuator to regulate the flow of fluid under pressure to the actuator, the improvement of a by-pass circuit for permitting fluid flow between the chambers of the actuator when the servo valve is jammed and when there is direct mechanical coupling to the actuator, so that hydraulic lock in the actuator is avoided, comprising:
    (a) first and second opposing normally closed check valves connected in series between the chambers of said actuator, and
    (b) a spool valve connected between said servo valve and said actuator, said spool valve having a spool, the position of said spool determining a neutral state, a first by-pass state and a second by-pass state for said spool valve,
    said spool valve when in said neutral state providing normal coupling, through said spool valve, between said servo valve and said actuator,
    said spool valve when in said first by-pass state providing a fluid by-pass around said first check valve and when in said second by-pass state providing a fluid by-pass around said second check valve.

4. The improvement of claim 3 wherein the point between said check valves is connected to the fluid under pressure.

5. The improvement of claim 3 wherein said spool valve has first, second and third chambers separated by first and second lands, the point between said check valves being connected through said second chamber to the fluid under pressure at all three of said states of said spool valve, said spool valve being placed in said first by-pass state when said spool is moved relative to its housing a first predetermined amount in a first axial direction and in said second by-pass state when said spool is moved relative to its housing a second predetermined amount in a second axial direction, said first chamber being connected across said first check valve when said spool valve is in said first by-pass state, and said third chamber being connected across said second check valve when said spool valve is in said second by-pass state.

6. The improvement of claim 3 further characterized by: an inlet line to said servo valve and a unidirectional flow control means in said inlet line, whereby an irreversible condition will be provided for said actuator.

7. The improvement of claim 6 wherein said unidirectional flow control means comprises a check valve.

References Cited

UNITED STATES PATENTS

| | | | |
|---|---|---|---|
| 2,155,421 | 4/1939 | Kenyon et al. | 91—391 XR |
| 2,566,273 | 8/1951 | Westbury | 91—391 XR |
| 2,597,418 | 5/1952 | Westbury et al. | 91—391 XR |
| 2,633,102 | 3/1953 | Baldwin et al. | 91—447 XR |
| 3,212,409 | 10/1965 | Mash | 91—464 XR |

EDGAR W. GEOGHEGAN, Primary Examiner

U.S. Cl. X.R.

60—51; 91—391, 437, 464

UNITED STATES PATENT OFFICE
CERTIFICATE OF CORRECTION

Patent No. 3,460,440                                        August 12, 1969

Robert G. Brent

It is certified that error appears in the above identified patent and that said Letters Patent are hereby corrected as shown below:

Column 2, line 36, "On" should read -- One --. Column 6, line 57, cancel "to". Column 8, line 49, "114b" should read -- 114d --. Column 10, line 31, "irreversibiilty" should read -- irreversibility --. Column 11, line 24, "sick" should read -- stick --.

Signed and sealed this 26th day of May 1970.

(SEAL)
Attest:

Edward M. Fletcher, Jr.                              WILLIAM E. SCHUYLER, JR.
Attesting Officer                                              Commissioner of Patents